United States Patent
Abiri et al.

(10) Patent No.: US 12,482,456 B2
(45) Date of Patent: Nov. 25, 2025

(54) SPEECH RECOGNITION BIASING

(71) Applicant: Google LLC, Mountain View, CA (US)

(72) Inventors: Olawale Abiri, Westfield, NJ (US); Qi Cao, Palo Alto, CA (US); Dharmeshkumar Jayantilal Mokani, Milpitas, CA (US)

(73) Assignee: Google LLC, Mountain View, CA (US)

( * ) Notice: Subject to any disclaimer, the term of this patent is extended or adjusted under 35 U.S.C. 154(b) by 270 days.

(21) Appl. No.: 18/152,749

(22) Filed: Jan. 10, 2023

(65) Prior Publication Data

US 2024/0233712 A1  Jul. 11, 2024

(51) Int. Cl.
| | | |
|---|---|---|
| *G10L 15/16* | (2006.01) | |
| *G10L 15/183* | (2013.01) | |
| *G10L 15/22* | (2006.01) | |
| *G10L 15/26* | (2006.01) | |

(52) U.S. Cl.
CPC ............ *G10L 15/16* (2013.01); *G10L 15/183* (2013.01); *G10L 15/26* (2013.01)

(58) Field of Classification Search
CPC ...................................................... G10L 15/22
See application file for complete search history.

(56) References Cited

U.S. PATENT DOCUMENTS

| | | | | |
|---|---|---|---|---|
| 2013/0317823 | A1* | 11/2013 | Mengibar | G06Q 30/08 704/E15.001 |
| 2018/0233131 | A1* | 8/2018 | Aleksic | G10L 15/07 |
| 2020/0357388 | A1 | 11/2020 | Zhao et al. | |
| 2020/0402501 | A1* | 12/2020 | Prabhavalkar | G10L 15/16 |
| 2022/0392432 | A1* | 12/2022 | Alphonso | G10L 15/22 |

OTHER PUBLICATIONS

He, Yanzhang, et al. "Streaming end-to-end speech recognition for mobile devices." ICASSP 2019-2019 IEEE International Conference on Acoustics, Speech and Signal Processing (ICASSP). IEEE, May 12, 2019. (Year: 2019).*

Undak, Golan, et al. "Deep context: end-to-end contextual speech recognition." 2018 IEEE spoken language technology workshop (SLT). IEEE, 2018. (Year: 2018).*

(Continued)

*Primary Examiner* — Jialong He
(74) *Attorney, Agent, or Firm* — Honigman LLP; Brett A. Krueger; Grant Griffith

(57) ABSTRACT

A method for speech recognition biasing includes receiving, from an application executing on a user device, at a speech service interface, a speech recognition request requesting a transcription of an utterance. The speech recognition request includes audio data encoding the utterance and configuration parameters for biasing a speech recognition model based on context data. The method includes processing, using the speech recognition model, the audio data to generate speech recognition scores for speech elements and determining context scores for the speech elements based on the configuration parameters and the context data. The method includes biasing the speech recognition scores using the context scores. The method also includes determining the transcription for the utterance based on the biased speech recognition scores.

18 Claims, 5 Drawing Sheets

(56) References Cited

OTHER PUBLICATIONS

Ray, Swayambhu Nath, et al. "Listen with intent: Improving speech recognition with audio-to-intent front-end." arXiv preprint arXiv:2105.07071 (2021). (Year: 2021).*

Kang, Young Mo, and Yingbo Zhou. "Fast and robust unsupervised contextual biasing for speech recognition." arXiv preprint arXiv:2005.01677 (2021). (Year: 2021).*

International Search Report and Written Opinion issued in related PCT Application No. PCT/US2024/010621, dated Apr. 8, 2024.

* cited by examiner

SPEECH RECOGNITION BIASING

TECHNICAL FIELD

This disclosure relates to speech recognition biasing.

BACKGROUND

Recognizing the context of speech is challenging for automated speech recognition (ASR) systems given the wide variety of words that people may speak and the many variations in accents and pronunciation. In many cases, the types of words and phrases that a person speaks varies depending on the context the person finds himself or herself in.

Contextual automated speech recognition (ASR) involves biasing speech recognition towards a given context, such as towards a user's own playlist, contacts, or geographic place names. Generally, the biasing may be accomplished by changing or adjusting a likelihood of recognition of a specific set of phrases or patterns relative to a given context. For example, some application have pre-determined context on what the user may dictate to a user device. Conventionally, such biasing is performed remote from a user device receiving the utterances or audio data of the user (e.g., at a distributed computing system or a "cloud" computing system).

SUMMARY

One aspect of the disclosure provides a computer-implemented method for speech recognition biasing. The method, when executed by data processing hardware of a user device, causes the data processing hardware to perform operations. The operations include receiving, from an application executing on the user device, at a speech service interface, a speech recognition request requesting a transcription of an utterance. The speech recognition request includes audio data encoding the utterance and configuration parameters for biasing a speech recognition model based on context data. The operations also include processing, using the speech recognition model, the audio data to generate speech recognition scores for speech elements and determining context scores for the speech elements based on the configuration parameters and the context data. The operations include biasing the speech recognition scores using the context scores. The operations also include determining the transcription for the utterance based on the biased speech recognition scores.

Implementations of the disclosure may include one or more of the following optional features. In some implementations, the configuration parameters include a list of strings. Each string in the list of strings includes a biasing phrase for the speech recognition model to bias toward. In some of these implementations, the configuration parameters include, for each respective string in the list of strings, a respective likelihood weight representing an amount of biasing for the respective string. In some of these implementations, the operations further include selecting an intent based on the list of strings and determining the context scores is based on the selected intent.

In some examples, the speech recognition request includes the context data. The context data may include context associated with the user device. Optionally, the configuration parameters include an intent representing a set of predetermined biasing weights for the speech recognition model.

The user device may be associated with a user that spoke the utterance. In some implementations, the speech recognition model includes an end-to-end speech recognition model. In some of these implementations, the end-to-end speech recognition model comprises a recurrent neural network-transducer (RNN-T). The utterance may be directed toward the application. Optionally, the speech service interface includes an application programming interface (API) for exposing functionality of the speech recognition model to the application.

Another aspect of the disclosure provides a system for speech recognition biasing. The system includes data processing hardware and memory hardware in communication with the data processing hardware. The memory hardware stores instructions that when executed on the data processing hardware cause the data processing hardware to perform operations. The operations include receiving, from an application executing on the user device, at a speech service interface, a speech recognition request requesting a transcription of an utterance. The speech recognition request includes audio data encoding the utterance and configuration parameters for biasing a speech recognition model based on context data. The operations also include processing, using the speech recognition model, the audio data to generate speech recognition scores for speech elements and determining context scores for the speech elements based on the configuration parameters and the context data. The operations include biasing the speech recognition scores using the context scores. The operations also include determining the transcription for the utterance based on the biased speech recognition scores.

This aspect may include one or more of the following optional features. In some implementations, the configuration parameters include a list of strings. Each string in the list of strings includes a biasing phrase for the speech recognition model to bias toward. In some of these implementations, the configuration parameters include, for each respective string in the list of strings, a respective likelihood weight representing an amount of biasing for the respective string. In some of these implementations, the operations further include selecting an intent based on the list of strings and determining the context scores is based on the selected intent.

In some examples, the speech recognition request includes the context data. The context data may include context associated with the user device. Optionally, the configuration parameters include an intent representing a set of predetermined biasing weights for the speech recognition model.

The user device may be associated with a user that spoke the utterance. In some implementations, the speech recognition model includes an end-to-end speech recognition model. In some of these implementations, the end-to-end speech recognition model comprises a recurrent neural network-transducer (RNN-T). The utterance may be directed toward the application. Optionally, the speech service interface includes an application programming interface (API) for exposing functionality of the speech recognition model to the application.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
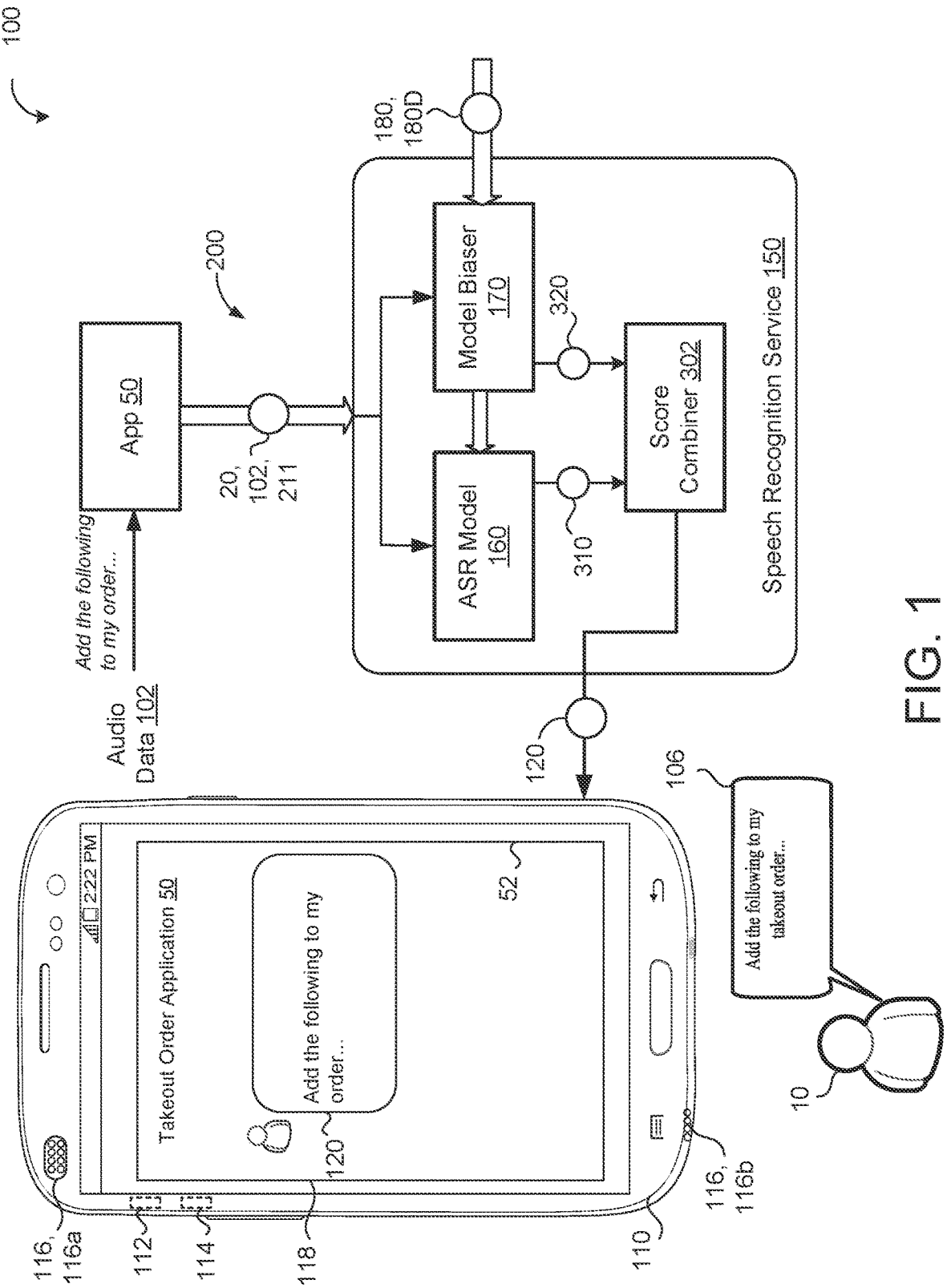
FIG. 1 is a schematic view of an example system for speech recognition biasing.

To provide high accuracy speech recognition, speech recognition systems can be configured to take into account the context in which speech occurs. The context may represent a particular domain or class of language, such as song names, application names, contact names, or locations, among others. For example, if the speech recognition system determines that a user is likely attempting to initiate a phone call, speech recognition quality may improve when the speech recognition system biases the recognition process toward names of contacts in the user's contact list.

Speech recognizers may be used in many different types of situations. For example, a speech recognizer may be adapted for use in a vehicle, by a mobile device without a display, by a mobile device with a display, by a digital assistant application running on a mobile phone, by a digital assistant application running on a computing device, such as, without limitation, a desktop computer, a laptop computer, a smart speaker, a smart appliance, a smart display, smart headphones, or other wearable device.

Speech recognizers may be used for many different purposes. For example, a speech recognizer may be used to request that a device plays a certain song or a music album by a certain artist. Speech recognizers may be used to call or text a contact, or to transcribe speech for input to an email, note, or calendar event. The various factors that indicate the situation in which an utterance occurs may be referred to as the context. Different contexts may have different sets of terms that are related and likely to be spoken by a user. In general, different context may be related to different words, topics, user actions, applications, device information, location, and so on. As a result, depending on the context that the speech recognition system identifies, the speech recognition system can bias different sets of terms to better match the expected speech of the user. This can greatly improve the accuracy of recognizing proper names and other terms that are unlikely in speech generally, but may be much more likely to occur within specific contexts or situations.

Speech biasing is an increasingly important tool to increase or improve transcription accuracy. Conventionally, speech biasing and/or transcription is performed "off-device" by, for example, transmitting some or all of audio data (or a representation of the audio data) to a remote device, such as a server or distributed computing environment (e.g., "the cloud"). Moreover, access to the speech recognition services of a user device is often limited for third-party application (e.g., applications created and/or maintained by an entity other than the manufacturer of the user device). This leaves third-party applications in the position of relying on third-party cloud speech services to provide contextual speech adaptation. However, this position results in increased latency and cost for use of the third-party application. Additionally, moving the audio data off-device is a privacy risk that lacks appeal for many privacy-sensitive users.

Implementations herein are directed toward a speech service interface for integrating local (i.e., "on-device") speech recognition biasing into the functionality of an application configured to execute on a user device. For example, the speech service interface includes an application programming interface (API) that receives a request for a transcription that includes one or more configuration parameters from an application executing on a user device for biasing a speech recognition model based on context data. The speech recognition model processes the audio data to generate speech recognition scores that are biased using context scores based on the configuration parameters and the context data. The speech recognition model determines a transcription based on the biased speech recognition scores. The transcription may be provided to the application via the speech service interface.

Referring to FIG. 1, an example system 100 operates in a speech environment. In the speech environment, a user's 10 manner of interacting with a client device, such as a user device 110, may be through voice input. The user device 110 is configured to capture sounds (e.g., streaming audio data) from one or more users 10 within the speech environment. Here, the streaming audio data may refer to a spoken utterance 106 by the user 10 that functions as an audible query, a command for the user device 110, or an audible communication captured by the user device 110. Speech-enabled systems of the user device 110 may field the query or the command by answering the query and/or causing the command to be performed/fulfilled by one or more downstream applications 50.

The user device 110 may correspond to any computing device associated with a user 10 and capable of receiving audio data or other user input. Some examples of user devices 110 include, but are not limited to, mobile devices (e.g., mobile phones, tablets, laptops, etc.), computers, wearable devices (e.g., smart watches, headsets, smart headphones), smart appliances, internet of things (IoT) devices, vehicle infotainment systems, smart displays, smart speakers, etc. The user device 110 includes data processing hardware 112 and memory hardware 114 in communication with the data processing hardware 112 and stores instructions, that when executed by the data processing hardware 112, cause the data processing hardware 112 to perform one or more operations. The user device 110 further includes an audio system 116 with an audio capture device (e.g., microphone) 116, 116*a* for capturing and converting spoken utterances 106 within the speech environment into electrical signals and a speech output device (e.g., a speaker) 116, 116*b* for communicating an audible audio signal (e.g., as output audio data from the user device 110). While the user device 110 implements a single audio capture device 116*a* in the example shown, the user device 110 may implement an array of audio capture devices 116*a* without departing from the scope of the present disclosure, whereby one or more capture devices 116*a* in the array may not physically reside on the user device 110, but be in communication with the audio system 116.

The user device 110 may execute a speech recognition service (SRS) 150 entirely on-device without having to leverage computing services in a cloud-computing environment. By executing the SRS 150 on-device, the SRS 150 may be personalized for the specific user 10 as components (i.e., machine learning models) of the SRS 150 learn traits of the user 10 through on-going process and update based thereon. On-device execution of the SRS 150 further improves latency and reduces costs (e.g., bandwidth costs). Moreover, on-device execution also preserves user privacy since data does not have to be transmitted back and forth between the user device 110 and a cloud-computing environment. The SRS 150 may provide streaming speech recognition capabilities such that speech is recognized in real-time and resulting transcriptions are displayed on a graphical user interface (GUI) 118 displayed on a screen of the user device 110 in a streaming fashion so that the user 10 can view the transcription as he/she is speaking. The SRS 150 may provide speech recognition biasing.

The SRS 250 receives, from the application 50, a speech recognition request 20 requesting the SRS 250 generate a transcription of the utterance 106 that the user 10 has directed toward the application 50. The speech recognition request 20 may include the audio data 102 encoding the utterance 106 and/or one or more configuration parameters 211 for biasing a speech recognition model 160 based on context data 180. For example, the application 50 generates the speech recognition request 20 in response to receiving the utterance 106 from the user 10 while the user 10 interacts with the application 50 via the user device 110. In the example of FIG. 1, the user provides the utterance 106 "Add the following to my takeout order . . . " The application 50 encodes this utterance 106 into the audio data 102 and provides the audio data 102 (or a representation of the audio data 102, a pointer to the audio data 102, etc.) to the SRS 250 for transcription.

The SRS 150 includes the speech recognition model 160. In some examples, the speech recognition model 160 is an automatic speech recognition (ASR) model 160. The ASR model 160 receives the audio data 102 (e.g., directly from the application 50 via the speech recognition request 20 or from other services executing on the user device 110) or a representation of the audio data 102 (e.g., acoustic features such as log-mel features or the like) and generates speech recognition scores 310 representing the likelihood that different speech elements have occurred. The speech elements may include wordpieces or graphemes. For example, the speech recognition model 160 outputs a vector of scores representing a probability distribution over a set of output targets, e.g. a set of different graphemes or wordpieces that can potentially be output. Thus, an output vector of speech recognition scores 310 from the ASR model 160 can indicate the likelihood that various graphemes or wordpieces accurately describe the speech in a portion of the audio data 102. In some examples, the ASR model 160 includes an end-to-end speech recognition model combining the functionality of a pronunciation model, an acoustic model, and a language model in a single model (e.g., neural network). In some of these examples, the ASR model 160 receives acoustic features generated from the audio data 102, or even the raw audio data 102, and provides output scores 310 indicating likelihoods of orthographic features (e.g., graphemes, wordpieces, or words) in response. The ASR model 160 processes the audio data 102 to generate the speech recognition scores 310 for speech elements.

The SRS 150 also includes a model biaser 170. The model biaser 170 receives various types of context data 180 of the utterance 106. For example, the model biaser 170 may receive information the user device 110 (i.e., device context 180, 180D), a task being performed by the user 10 using the user device 110, an application that is open or active on the user device 110, context about the user 10, and so on. The model biaser 170 may also receive data indicating the most recent speech recognition decisions, such as most recently recognized grapheme, wordpiece, word, or phrase, including in partial or preliminary transcriptions during a beam search process. As discussed in more detail below, using any or all of this context data 180, the model biaser 170 can apply different biasing weights to change the likelihood of recognition of specific words and phrases. To this end, the model biaser 170 determines context scores 320 for the speech elements based on the configuration parameters 211 and the context data 180. In some examples, the SRS 150 receives some or all of the context data from the application 50 via the speech recognition request 20.

In some implementations, the SRS 150 includes a score combiner 302. As discussed in more detail with regards to FIG. 3, the score combiner 302, using the context scores 320, biases the speech recognition scores 310. Based on the biased speech recognition scores 310, the SRS 150 determines the transcription 120 for the utterance 106. The SRS 150 may provide the transcription 120 to the application 50 for display on the GUI 18 (as shown in FIG. 1) or for any other purpose the application 50 may require. For example, a keyboard application adds one or more words or phrases from the transcription 120 to a dictionary for storage.

An operating system 52 of the user device 110 may execute a software application 50 on the user device 110. The user device 110 may use a variety of different operating systems 52. In examples where a user device 110 is a mobile device, the user device 110 may run an operating system including, but not limited to, ANDROID® developed by Google Inc., IOS® developed by Apple Inc., or WINDOWS PHONE® developed by Microsoft Corporation. Accordingly, the operating system 52 running on the user device 110 may include, but is not limited to, one of ANDROID®, IOS®, or WINDOWS PHONE®. In some examples a user device may run an operating system including, but not limited to, MICROSOFT WINDOWS® by Microsoft Corporation, MAC OS® by Apple, Inc., or Linux.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications. For example, the application 50 may be a voice accessibility application that allows users with dexterity impairments to operate a device via voice commands, a language teaching or training application that evaluates dictation of the user in various languages, or a keyboard application that allows the user to dictate words to add to a dictionary supported by the keyboard application.

The user device 110 executes a speech service interface 200 configured to receive configuration parameters 211 from the software application 50 for integrating the functionality of the SRS 150 into the software application 50 executing on the user device 110. In some examples, the speech service interface 200 includes an open-sourced API that is visible to the public to allow application developers to integrate the functionality of the SRS 150 into their applications. That is, the API exposes functionality of the SRS 150 to the applications 50 executing on the user device 110. In the example shown, the application 50 includes a meal takeout application that provides a service to allow the user 10 to place orders for takeout meals from a restaurant. More specifically, the speech service interface 200 integrates the functionality of the SRS 150 into the application 50 to permit the user 10 to interact with the application 50 through speech such that the user 10 can provide spoken utterances 106 to place a meal order in an entirely hands free manner. Advantageously, the SRS 150 may perform contextual biasing to improve transcription accuracy of specific sets of phrases or patterns in the spoken utterances 106. For instance, the meal takeout application 50 may allow the user 10 to place orders for takeout meals through speech (i.e., spoken utterances 106) and the SRS 150 may bias speech recognition toward specific menu items that are frequently ordered. This increases the transcription accuracy of the SRS 150 for many words that otherwise may be infrequently used and/or predicted.

Figure 2:
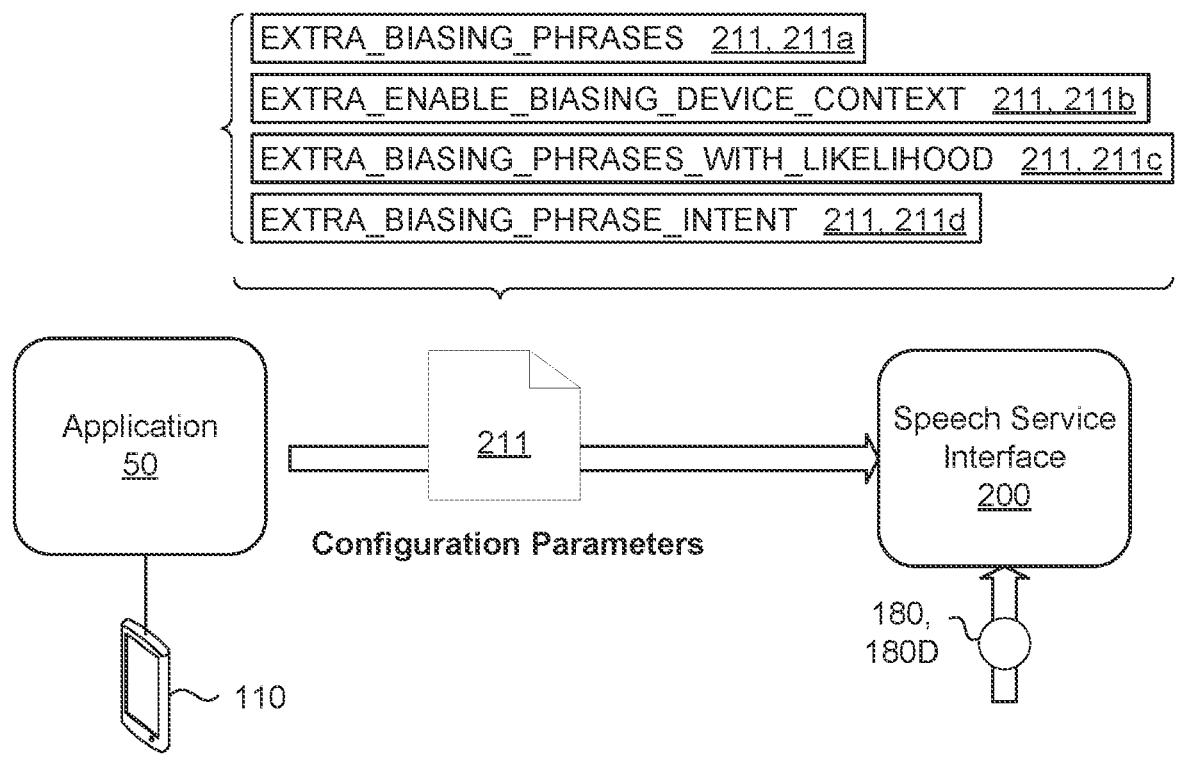
FIG. 2 is a schematic view of an example application executing on a user device providing a set of configuration parameters to a speech service interface for integrating the speech service into the application.

FIG. 2 shows a schematic view of the speech service interface 200 receiving a plurality of configuration parameters 211 from the application 50 executing on the user device 110 to integrate functionality of the SRS 150 into the application 50. Each configuration parameter 211 may represent a key-value pair (i.e., a 2-tuple in the form of <parameter name, value>). The configuration parameters 211 may include a number of parameters for configuring or adjusting the speech biasing. For example, the configuration parameters 211 include a set of biasing phrases 211, 211a (i.e., "EXTRA BIASING PHRASES"). The set of biasing phrases 211a includes an optional list of strings that the SRS 150 should bias the recognition results toward that are separate from any user device 110 context (e.g., contextual information based on information associated with the user device 110, such as location, orientation, specifications, etc.). For example, when the application 50 is a meal ordering application for a restaurant, the set of biasing phrases 211a may include values (e.g., strings) such as "Kung Pao Chicken," "Mapo Tofu," and "Chow Mein" to bias the SRS 150 toward commonly ordered menu items.

In some examples, the configuration parameters 211 include a device context parameter 211, 211b (i.e., "EXTRA ENABLE BIASING DEVICE CONTEXT"). This optional configuration parameter 211b enables the SRS 150 to bias the results of the transcription 120 using device context 220. The device context 220 includes any contextual information related to or associated with the user device 110. For example, the device context 220 includes information about a location of the user device 110, a task being performed by the user 10 using the user device 110, an application that is open or active on the user device 110, and so on. For example, when the device context 220 indicates that the user device 110 is geographically located within a specific region, the SRS 150 may bias the results of the transcription 120 toward locations and/or points of interest located within the specific region. The speech service interface 200 may receive the device context 220 from the operating system 52 or other application 50/service executing on the user device 110.

The configuration parameters 211, in some implementations, include a set of biasing phrases with likelihood 211, 211c (i.e., "EXTRA BIASING PHRASES WITH LIKELIHOOD"). Like the set of biasing phrases 211a, the set of biasing phrases with likelihood 211c includes an optional list of strings that the SRS 150 should bias the recognition results toward that are separate from any user device 110 context. In addition, each biasing phrase in the set of biasing phrases with likelihood 211c includes a respective likelihood weight representing an amount of biasing (e.g., weights) for the respective biasing phrase (e.g., string). That is, the set of biasing phrases with likelihood 211c allow the application 50 to specify an explicit amount of biasing for each biasing phrase included in the set of biasing phrases with likelihood 211c. The set of biasing phrases with likelihood 211c may be in addition to the set of biasing phrases 211a or alternative to the set of biasing phrases 211a.

In some examples, the configuration parameters 211 include a biasing intent parameter 211, 211d (i.e., "EXTRA BIASING PHRASE INTENT"). The value of the biasing intent parameter 211d maps to an enumeration of a set of predetermined biasing phrases/weights associated with a particular intent (i.e., automatically select biasing weights for different phrases). For example, the biasing intent parameter 122d indicates an intent of "Order Food" which in turn maps to an associated set of predetermined biasing phrases intended to bias the results (i.e., for the transcription 120) more likely to occur when the user 10 is ordering food. The sets of predetermining biasing phrases may be stored at the user device 110 (e.g., at the memory hardware 114). The biasing intent parameter 122d may map to any number of intents, such as for an ordering food intent, a communications intent, a navigation intent, and so on. Each respective predetermined biasing phrase may be associated with a corresponding predetermined biasing weight that determines an amount to bias the respective predetermined biasing phrase. In some examples, the SRS 150 automatically determines or selects the intent based on classification of the set or list of biasing phrases 211a. For example, when the set of biasing phrases 211a includes a number of phrases associated with ordering food, the SRS 150 may automatically include a set of predetermined biasing phrases associated with the intent of ordering food that may be in addition or alternative to any of the set of biasing phrases 211a provided by the application 50. The SRS 150 may determine the context scores 320 based at least partially on the automatically selected intent.

The application 50 may provide the configuration parameters 211 to the speech service interface 200 as an input API call. The application 50 may provide configuration parameters 211 on an ongoing basis and may change values for some configuration parameters 211 based on any combination of user inputs, changes in user context/and/or changes in ambient context.

Figure 3:
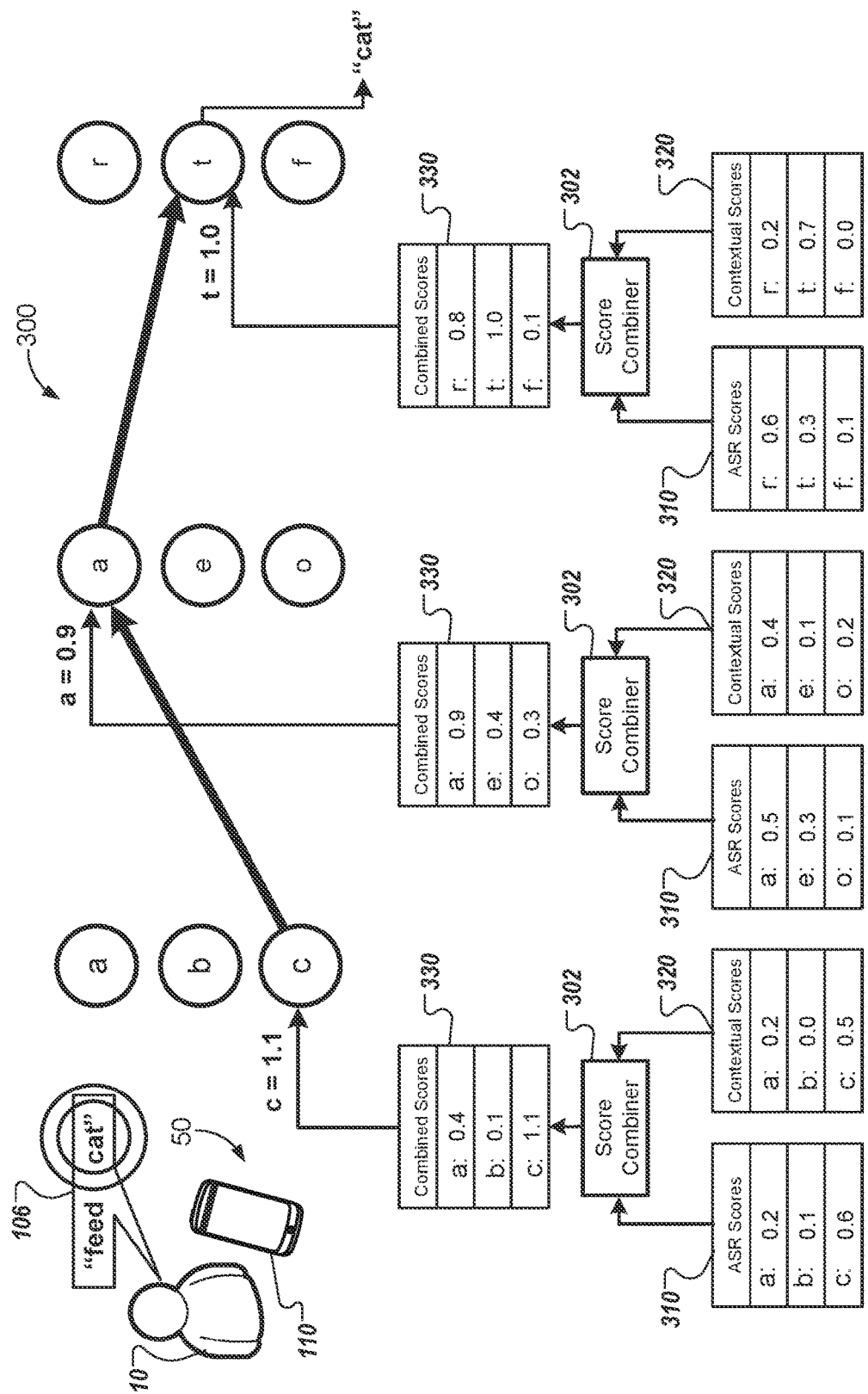
FIG. 3 is a schematic view of a speech recognition service executing a biasing process based on speech recognition scores and context scores.

FIG. 3 shows a diagram 300 of the SRS 150 biasing the speech recognition scores 310. In this example, the SRS 150 performs an optional pruning process based on the speech recognition scores 310 and the context scores 320. In the example shown, the user 10 is interacting with an application 50 on the user device 110 that can control household equipment, including an automatic pet feeder. The application 50 generates a speech recognition request 20 for the SRS 250 to bias words associated with household equipment such as the pet feeder. The user 10 speaks the utterance 106 including the words "feed cat" into the one or more microphones of the user device 110.

In some examples, the model biaser 170 (FIG. 1) recognizes (e.g., in a preliminary transcription) the occurrence of the prefix "feed" as a commonly used prefix for a home automation category/context (i.e., an automation intent), and thereby biases words that are likely to follow "feed", such as "fish", "dog", and "cat." That is, the inclusion of the word "feed" may cause the SRS 250 to automatically select an intent (i.e., such as a biasing intent parameter 211d) to enable the biasing of words/phrases associated with the home automation category/context. The model biaser 170 references the configuration parameters 211 (e.g., the set of biasing phrases with likelihood 211c), the intent, and/or any other context data 180 (e.g., device context 180D) to calculate the context scores 320 while the ASR model 160 (e.g., at the same time) evaluates the audio data 102 to calculate the speech recognition scores 310.

Steps one (1) through three (3) depict successive output steps the SRS 150 may performs in recognizing different pans/portions of the audio data 102 for the word "cat", which follows the word "feed" in the corresponding utterance 106. As set forth in the remarks above, the configuration parameters 211 and/or the preliminary transcription recognized by the model biaser 170 causes the model biaser 170 to generate the context scores 320 for use in biasing the speech recognition scores 310 made in Steps 1-3.

In step 1, the score combiner 302 combines the ASR scores 310 (interchangeably referred to as "speech recognition scores") and the context scores 320 to calculate combined scores 330. Based on the combined scores 330, in this example, the grapheme "c" is identified as most likely, with a combined score 330 of 1.1. The ASR scores 310 and context scores 320 are recalculated at each step in the pruning process.

In step 2, the score combiner 302 combines the ASR scores 310 and the context scores 320 for each of the output labels in the output distribution of the current step to calculate the corresponding combined scores 330. Thus, in step 2, the grapheme "a" is identified as most likely, with a combined score 330 of 0.9.

In step 3, although the highest ASR scores 310 of 0.6 is for the grapheme "r", which would result in the pruning process omitting the grapheme "t" to incorrectly output the word "car" in the resulting transcription 185, the context score 320 of 0.8 shows a high likelihood for the grapheme "t". Accordingly, although the ASR score 310 of 0.3 for the grapheme "t" is not the highest ASR score 310 in step 3, the biasing process now identifies the grapheme "t" as the most likely output label in step 3, with a combined score 330 of 1.0. Thus, the biasing process may now correctly output the candidate word "cat" following the word "feed" in the resulting transcription 120. In this example, if the SRS 150 did not consider the context scores 320 until after pruning, the pruning process would have pruned the correct candidate word "cat" prematurely without the opportunity to apply the context scores 320. Thus, the configuration parameters 211 provided by the application 50 cause the SRS 150 to calculate a context score 320 for the grapheme "t" that his higher than a context score 320 for the grapheme "r" after the ASR model 160 identifies the probable graphemes "c" and "a". Thus, the SRS 150 is able to improve accuracy of the transcription 120 by generating the context scores 320 and combining the context scores 320 with the ASR scores 310 output from the ASR model 160 before applying pruning on candidate graphemes or wordpieces.

In some examples, the ASR model 160 of the SRS 150 includes a recurrent neural network-transducer (RNN-T). An RNN-T model may provide a small computational footprint and utilize less memory requirements than conventional ASR architectures, making the RNN-T model architecture suitable for performing speech recognition entirely on the user device 110 (e.g., no communication with a remote server is required). In some of these examples, the SRS 150 outputs the transcription 120 in a streaming fashion such that graphemes are individually output at each output step. In some examples, the SRS 150 may wait to output wordpieces containing multiple graphemes or whole words in the transcription 120. In some implementations, neural network contextual biasing applies the context scores 320 only at word boundaries. This approach may not be effective when the list of contextual phrases contains many proper nouns such as song names or contacts. Because neural network models may predict sub-word units such as graphemes and wordpieces during a beam search, applying context scores 320 at word boundaries will not work if the words to be biased are not present in the beam.

Thus, the SRS 150, via the speech service interface 200, provides applications 50 support for contextual adaptation without exposing low level biasing parameters/configuration to the applications 50. Because biasing works by using contextual data as a basis for adjusting a recognition likelihood of specific phrases, the speech service interface 200 allows applications 50 to provide signals about the relative likelihood of phrases supplied by the user 10. The SRS 150 may use these signals to determine an amount of adjustment required to underlying speech recognition scores 310. The speech service interface 200 provides an interface robust and resilient to ASR technology changes, which reduces a likelihood that applications 50 must migrate integration configurations when the ASR model 160 updates or changes. Moreover, the speech service interface 200 allows applications 50 to support use of many contextual data sources (e.g., location based information) on-device, which offers users 10 additional privacy.

Figure 4:
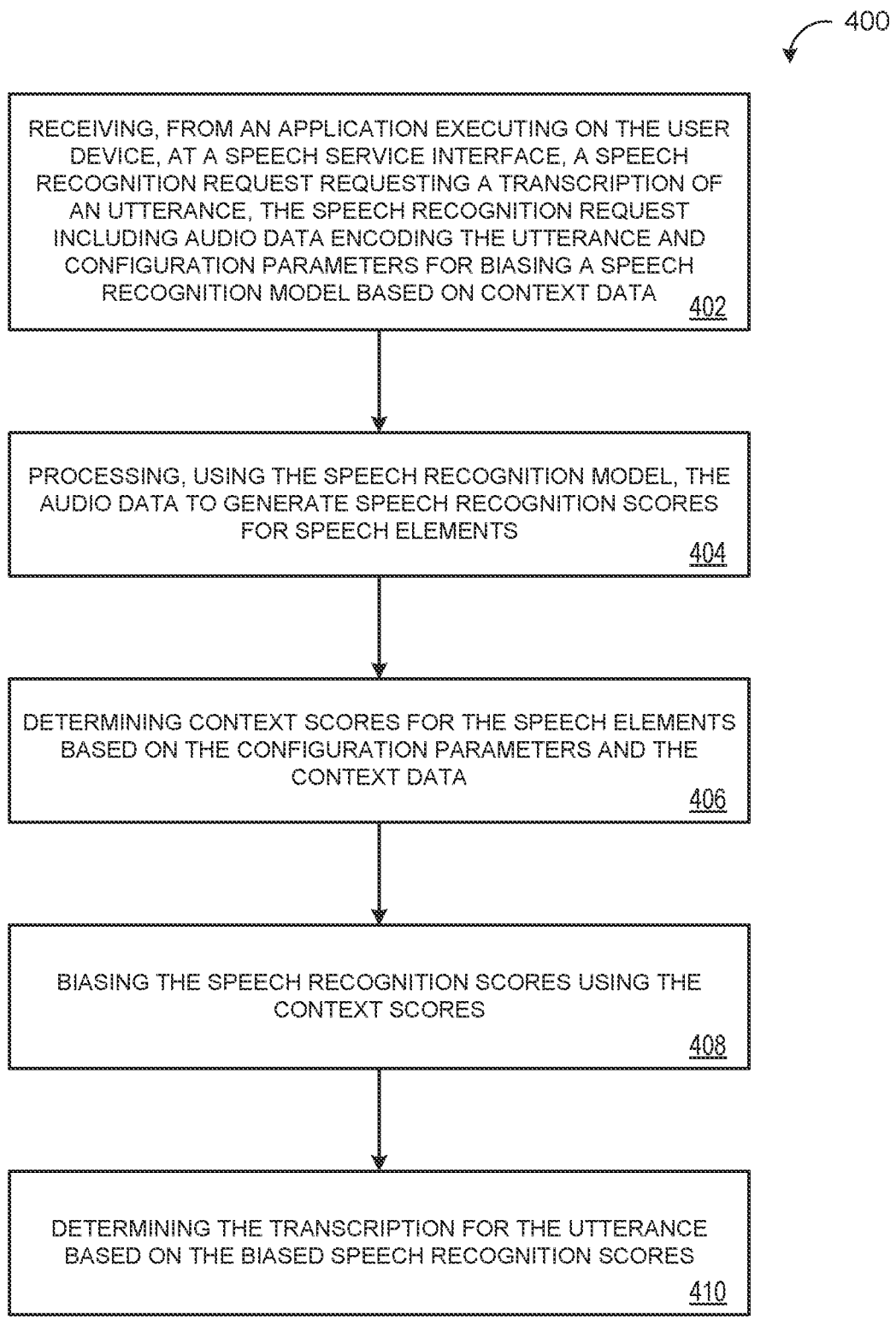
FIG. 4 a flowchart of an example arrangement of operations for a method for speech recognition biasing.

FIG. 4 is a flowchart of an exemplary arrangement of operations for a method 400 for speech recognition biasing. The method 400, when executed by data processing hardware 112 of a user device 110, causes the data processing hardware 112 to perform operations. The operations include receiving, from an application 50 executing on the user device 110, at a speech service interface 200, a speech recognition request 20 requesting a transcription 120 of an utterance 106. The speech recognition request 20 includes audio data 102 encoding the utterance 106 and configuration parameters 211 for biasing a speech recognition model 160 based on context data 180. The operations also include processing, using the speech recognition model 160, the audio data 102 to generate speech recognition scores 310 for speech elements and determining context scores 320 for the speech elements based on the configuration parameters 211 and the context data 180. The operations include biasing the speech recognition scores 310 using the context scores 320. The operations also include determining the transcription 120 for the utterance 106 based on the biased speech recognition scores 310.

Figure 5:
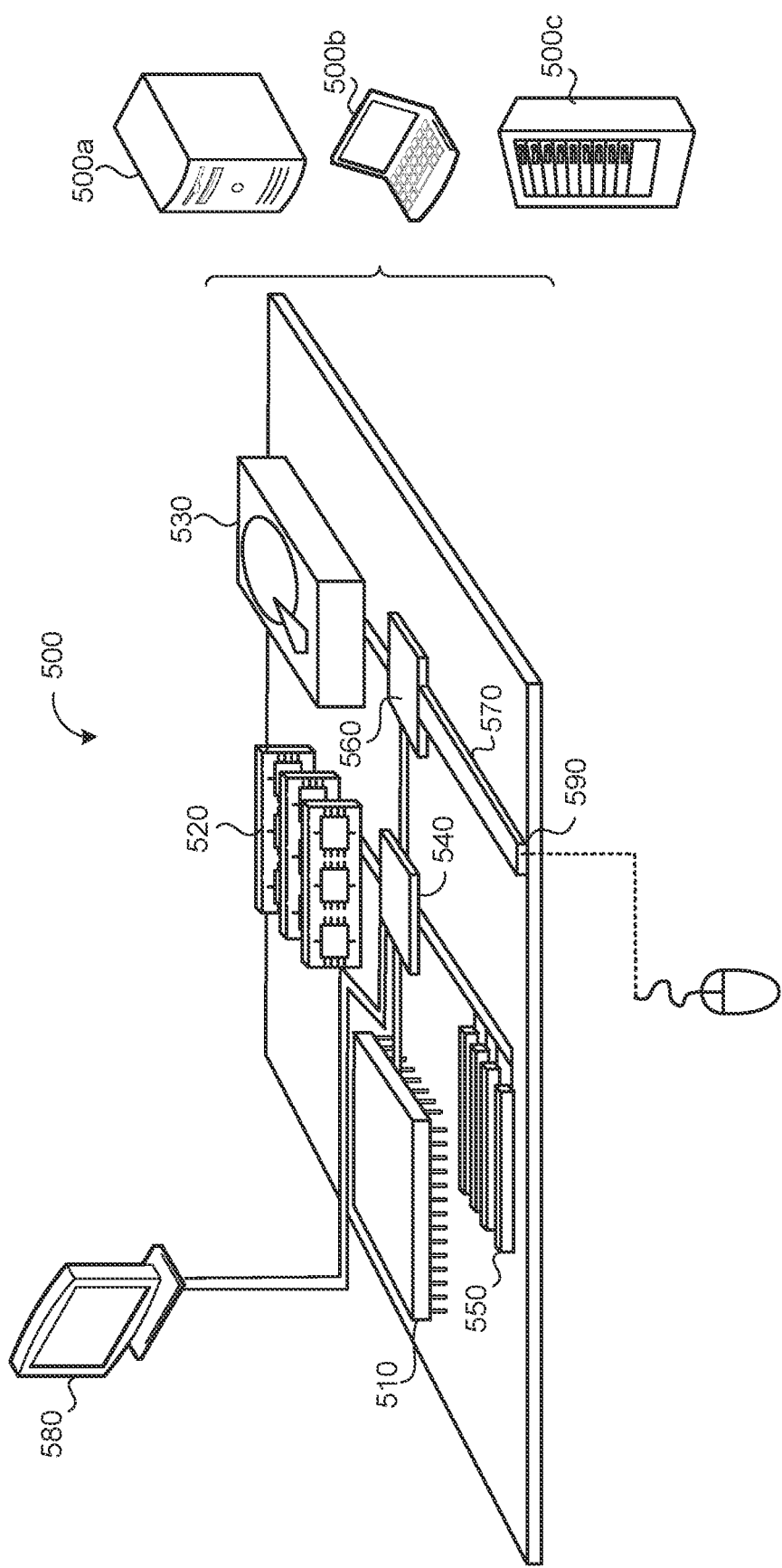
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware of a user device that causes the data processing hardware to perform operations comprising:
   receiving, at a speech service interface, context data for biasing a speech recognition model, the context data comprising contextual information associated with the user device and/or associated with a user of the user device;
   receiving, from an application executing on the user device, at the speech service interface, a speech recognition request requesting a transcription of an utterance, the speech recognition request comprising:
   audio data encoding the utterance; and
   configuration parameters for biasing the speech recognition model, the configuration parameters comprising:
   a set of biasing phrases separate from the context data, the set of biasing phrases input by a developer of the application executing on the user device;
   for each respective biasing phrase in the set of biasing phrases, a respective likelihood weight representing an amount of biasing specified by the developer of the application for the respective biasing phrase; and
   a biasing intent parameter mapped to one or more intents, each respective intent enumerating a corresponding subset of predetermined biasing phrases associated with the respective intent;
   processing, using the speech recognition model, the audio data to generate speech recognition scores for speech elements;
   determining context scores for the speech elements based on the configuration parameters and the context data;
   biasing the speech recognition scores using the context scores; and
   determining the transcription for the utterance based on the biased speech recognition scores.

2. The method of claim 1, wherein:
   the operations further comprise selecting a respective intent of the one or more intents based on the configuration parameters; and
   determining the context scores is based on the selected intent.

3. The method of claim 1, wherein the speech recognition request comprises the context data.

4. The method of claim 1, wherein the configuration parameters further comprise a subset of predetermined biasing weights associated with the corresponding set of biasing phrases for the speech recognition model.

5. The method of claim 1, wherein the user device is associated with the user that spoke the utterance.

6. The method of claim 1, wherein the speech recognition model comprises an end-to-end speech recognition model.

7. The method of claim 6, wherein the end-to-end speech recognition model comprises a recurrent neural network-transducer (RNN-T).

8. The method of claim 1, wherein the utterance is directed toward the application.

9. The method of claim 1, wherein the speech service interface comprises an application programming interface (API) for exposing functionality of the speech recognition model to the application.

10. A system comprising:
    data processing hardware of a user device; and
    memory hardware in communication with the data processing hardware, the memory hardware storing instructions that when executed on the data processing hardware cause the data processing hardware to perform operations comprising:
    receiving, at a speech service interface, context data for biasing a speech recognition model, the context data comprising contextual information associated with the user device and/or associated with a user of the user device;
    receiving, from an application executing on the user device, at the speech service interface, a speech recognition request requesting a transcription of an utterance, the speech recognition request comprising:
    audio data encoding the utterance; and
    configuration parameters for biasing the speech recognition model, the configuration parameters comprising:
    a set of biasing phrases separate from the context data, the set of biasing phrases input by a developer of the application executing on the user device;
    for each respective biasing phrase in the set of biasing phrases, a respective likelihood weight representing an amount of biasing specified by the developer of the application for the respective biasing phrase; and
    a biasing intent parameter mapped to one or more intents, each respective intent enumerating a corresponding subset of predetermined biasing phrases associated with the respective intent;
    processing, using the speech recognition model, the audio data to generate speech recognition scores for speech elements;
    determining context scores for the speech elements based on the configuration parameters and the context data;
    biasing the speech recognition scores using the context scores; and
    determining the transcription for the utterance based on the biased speech recognition scores.

11. The system of claim 10, wherein:
    the operations further comprise selecting a respective intent of the one or more intents based on the configuration parameters; and
    determining the context scores is based on the selected intent.

12. The system of claim 10, wherein the speech recognition request comprises the context data.

13. The system of claim 10, wherein the configuration parameters further comprise a subset of predetermined biasing weights associated with the corresponding set of biasing phrases for the speech recognition model.

14. The system of claim 10, wherein the user device is associated with the user that spoke the utterance.

15. The system of claim 10, wherein the speech recognition model comprises an end-to-end speech recognition model.

16. The system of claim 15, wherein the end-to-end speech recognition model comprises a recurrent neural network-transducer (RNN-T).

17. The system of claim 10, wherein the utterance is directed toward the application.

18. The system of claim 10, wherein the speech service interface comprises an application programming interface (API) for exposing functionality of the speech recognition model to the application.

\* \* \* \* \*